United States Patent Office 2,800,670
Patented July 30, 1957

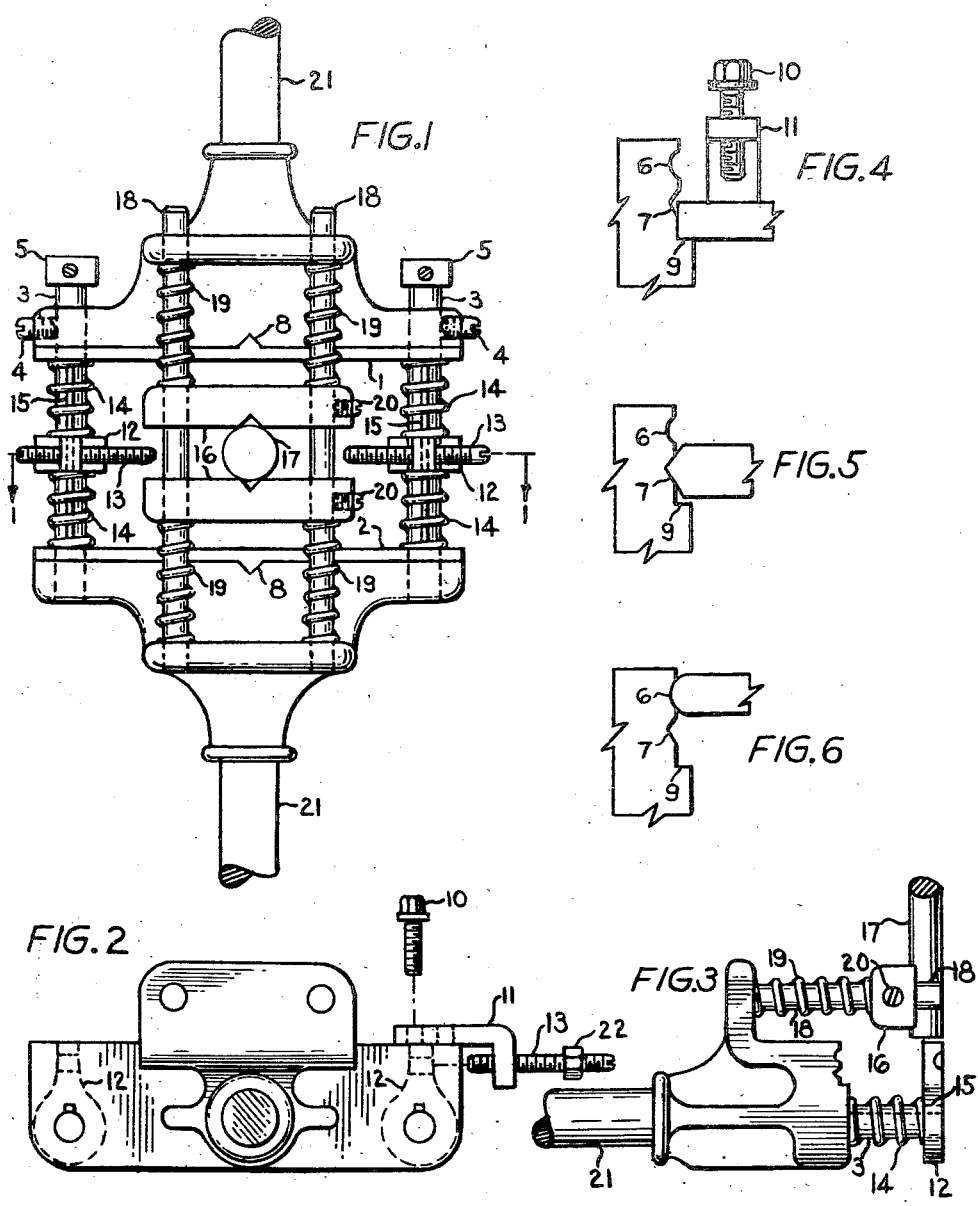

2,800,670

TAP AND DIE HOLDER

Max Fogiel, New York, N. Y.

Application July 5, 1955, Serial No. 519,763

5 Claims. (Cl. 10—116)

This invention relates to a combined die stock and tap wrench which is able to accommodate various types and sizes of dies and taps.

Manufacturers of threading dies are producing numerous different types of dies for the purpose of cutting threads on shafts and pipes or tubes. Depending on the manufacturer of a particular set of dies, one or another type of die stock is required to properly hold the dies in place during the threading operation. Thus among the different types of dies used for threading purposes, the external shape of the dies are available as round, square, hexagonal, and die sets consisting of two half sections. The two half sections may possess either V or beveled edges. For any given type of die or die set different die stocks are also required for different ranges of sizes. By employing the tap and die holder described in this specification it will be unnecessary for the machinist to store numerous die stocks in order to accommodate the various different types and sizes of dies.

Figure 1 is an assembled top view of the tap and die holder showing the relationship between the tap and die holder parts, work to be threaded, and turning handles attached to the frame sections.

Figure 2 is a front view of the tap and die holder giving the details of fastening brackets in place for the purpose of maintaining the two half sections of a die set in their proper positions.

Figure 3 is an assembled side view of the part of the tap and die holder obtained by cutting through line 1—1.

Figure 4 represents a detail drawing of the contour of the jaw face showing the manner in which the two half sections of split die sets having flat edges are held in their proper place.

Figure 5 represents a detail drawing of the contour of the jaw face showing the manner in which the two half sections of split die sets having V-shaped edges are held in their proper place.

Figure 6 represents a detail drawing of the contour of the jaw face showing the manner in which the two half sections of split die sets having beveled edges are held in their proper place.

The tap and die holder consists essentially of two jaws 1 and 2. These jaws are maintained in proper alignment by guide rods 3. The guide rods are permanently fastened to jaw 2 but jaw 1 is free to slide along the rods. The distance between the jaws is regulated by means of set screws 4 which hold jaw 1 at any desirable position along guide rods 3. Removable caps 5 act as stops which prevent jaw 1 from slipping off the guide rods. The purpose of permitting the distance between jaws to be adjustable is to accommodate different widths of dies or die sets. The faces of jaws 1 and 2 are machined to include a bevel 6, V notch 7 and 8, and a step 9. As shown in Figure 6, the bevel 6 furnishes the holding surface for split die halves which have beveled edges. V notch 7 provides a similar mating surface for die sets which have V edges as illustrated in Figure 5. Step 9 is included for the purpose of accommodating die sets which have flat adjacent edges that are located 90° with respect to each other as shown in Figure 4. These flat die sets are firmly held against step 9 by means of set screws 10 which are held by brackets 11 that are attached to hubs 12. V notch 8 serves the purpose of holding round dies. Set screw 13 extends into the indentation present on the surface of round dies to prevent them from turning during the threading operation. Hexagon dies are held in the die stock by resting its flat edges on step 9 and clamping it in position along the step by means of set screw 13. The purpose of hubs 12 is to hold set screws 13 which maintain the two sections of the dies at the proper distance between them, in addition to performing the other functions already mentioned. Set screws 13 thus make it possible to adjust the depth of the cut screw thread. The hubs being free to slide axially along the guide pins 3 are continuously maintained at a position which is equidistant from the two jaws by means of the compression springs 14. In this manner set screws 13 and 10 will always be centrally located with respect to the two half sections of a die set. Keyways 15 prevent the hubs from turning relative to the guide pins. A number of threaded holes are located horizontally along brackets 11 in order to make possible different lengths of die sections. Set screw 10 provides flexibility from the viewpoint of allowing variable thickness of die sections. The arrangement of screw 13 and nut 22 makes it possible to hold bracket 11 properly in place while permitting adjustment with respect to the distance between the two half sections of a die set.

Guide jaws 16 are introduced to properly guide the shaft or pipe to be threaded towards the dies which are held in position by jaws 1 and 2. Guide jaws 16 contain V notches which aid in establishing the proper relationship between the position of the die stock and that of the shaft 17 or pipe to be threaded. The guide jaws are free to slide axially along the guide pins 18 which are fastened to jaw 2 but permit jaw 1 to move axially along them. Springs 19 maintain the position of the guide jaws so that the shaft or pipe to be threaded is located equidistant from the two jaws. In this way the part to be threaded in centrally located with respect to the cutting edges of the dies. Set screws 20 allow the jaws to be fastened to guide pin 18 after the work to be threaded has positioned them properly, and the jaws thus form a firm guiding surface. Handles 21 are fastened into the sockets which are part of jaws 2 and 1 in order to decrease the force required to be exerted by the person while turning the die stock during the threading operation. Screw threads cut on the ends of the handles and in the sockets make it possible to attach the handles by screwing them into the sockets.

By placing the square end of a tap into the V notches of guide jaws 16 it is possible to employ the preceding device as a tap wrench. The tap may also be held in an alternate manner by spreading guide jaws 16 an adequate distance apart, and placing the square end of the tap into V notch 8 of jaws 1 and 2. Guide jaws 16 are held in place at the required distance between them by means of screws 20. Adjustability with respect to the distance between guide jaws 16 and jaws 1 and 2 makes it possible to accommodate different tap sizes.

I claim:

1. A tap and die holder comprising in combination a first frame member containing notches to selectively seat and support part of either a circular edged die, square edged die, V-edged die, or bevel edged die, a second frame member containing notches to cooperate with the first frame member in the seating and supporting of said dies, guide shafts rigidly fastened to said first frame member and freely held in bearings contained by said second frame member to align said first and second frame members, setting screws held in threaded holes contained by said second frame member and bearing against said guide shafts to maintain said frame members apart the fixed distance equal to the width of the die held in said tap and die holder, setting screws mounted parallel to said notches and bearing against the unseated edges of a split die set to adjust the distance between the two sections of said split die set and to locate said die set centrally with respect to said frame members, supporting members containing screw threaded holes to retain said setting screws for adjusting the distance between split die sections, said supporting members containing bearings to permit sliding of said supporting members along said guide shafts, lock nuts mounted on said setting screws and bearing against said supporting members to maintain said setting screws in a fixed position after they have been used to adjust the selected distance between said split die sections, compression springs mounted on said guide shafts and bearing against each side of said supporting members sliding along said guide shafts to retain said supporting members in a central location with respect to said frame members, each one of said springs bearing against a side of said supporting member and against the corresponding frame member, retaining screws to bear against said square edged die in order to retain it against its seat, links containing threaded holes to hold said retaining screws, said links being fastened to said supporting members to retain said links in a central location with respect to said frame members, a first slotted guide member to guide the work to be threaded squarely towards the die or die set seated in the notches of said frame members, a second identical slotted guide member to cooperate with the first guide member in guiding the work, secondary guide shafts rigidly fastened to said first frame member and freely held in bearings contained by said second frame member to align said first and second guide members and provide adjustment means for accommodating work of different size, said guide members containing bearings to permit said guide members to slide freely along said secondary guide shafts, and said guide members containing setting screws to maintain said guide members in a fixed position after adjustment by bearing against the surface of said secondary guide shafts, compression springs mounted on said secondary guide shafts and bearing against each side of said guide members sliding along said secondary guide shafts to retain said guide members in a central location with respect to said frame members, each one of said springs bearing against a side of said guide member and against the corresponding frame member, handles to act as levers permitting manual turning of said tap and die holder, and means for fastening said handles to said frame members.

2. The tap and die holder of claim 1 wherein said guide shafts aligning said frame members contain mechanical stops to prevent said second frame member from sliding off said guide shafts.

3. The tap and die holder of claim 2 wherein said stops consist of collars fastened to said guide shafts.

4. The tap and die holder of claim 1 wherein said guide shafts and supporting members sliding along said guide shafts contain keyway slots to retain said supporting members in their upright position as they slide along said guide shafts.

5. The tap and die holder of claim 4 wherein a key is fastened into the keyway of said supporting member, said key extending into the keyway of said guide shaft to guide said supporting member along said guide shaft in an upright position.

References Cited in the file of this patent

UNITED STATES PATENTS

| 757,131 | Leonard | Apr. 12, 1904 |
| 1,404,546 | Roeder | Jan. 24, 1922 |

FOREIGN PATENTS

| 23,251 | Finland | May 19, 1949 |